Dec. 19, 1961     P. CHARRIN ETAL     3,014,174
APPARATUS FOR OBTAINING INDICATIONS OF PERMEABLE
FORMATIONS TRAVERSED BY BOREHOLES
Filed March 2, 1955     4 Sheets-Sheet 1
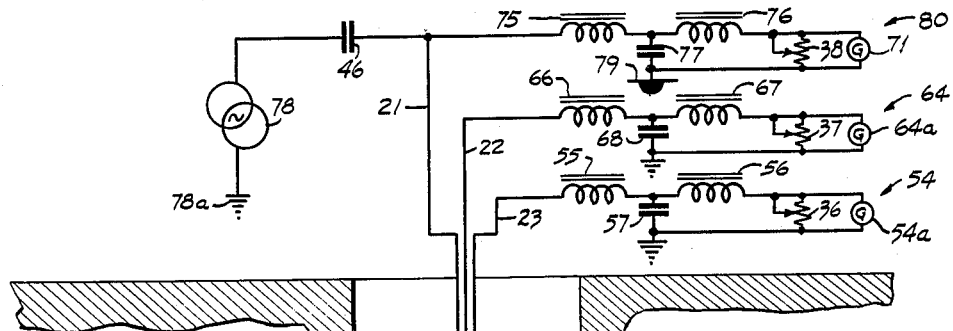
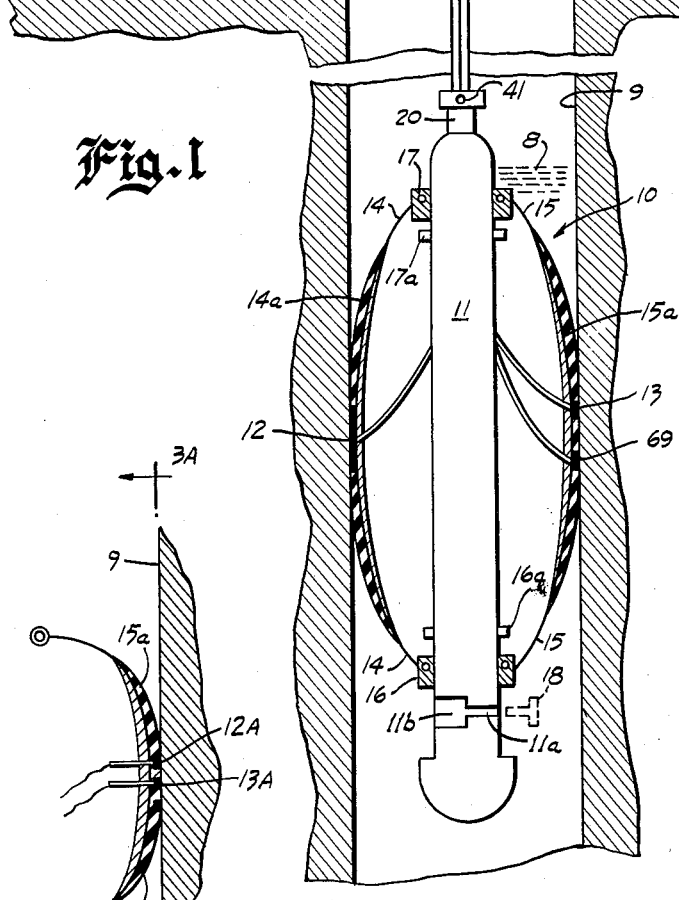
Fig.1
Fig.3
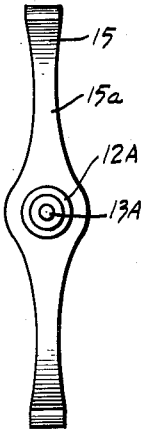
Fig.3A
INVENTORS
PAUL CHARRIN
AND HENRY C. WATERS
BY
Mason, Kolehmainen, Rathburn & Wyss
ATTORNEYS Dec. 19, 1961  P. CHARRIN ETAL  3,014,174
APPARATUS FOR OBTAINING INDICATIONS OF PERMEABLE
FORMATIONS TRAVERSED BY BOREHOLES
Filed March 2, 1955  4 Sheets-Sheet 3

INVENTORS
PAUL CHARRIN
AND HENRY C. WATERS
BY
ATTORNEYS

INVENTORS
PAUL CHARRIN
AND HENRY C. WATERS
BY
ATTORNEYS

United States Patent Office 3,014,174
Patented Dec. 19, 1961

---

3,014,174
APPARATUS FOR OBTAINING INDICATIONS OF PERMEABLE FORMATIONS TRAVERSED BY BOREHOLES
Paul Charrin and Henry C. Waters, Houston, Tex., assignors, by mesne assignments, to PGAC Development Company, Houston, Tex., a corporation of Texas
Filed Mar. 2, 1955, Ser. No. 491,678
12 Claims. (Cl. 324—1)

This invention relates generally to a method and apparatus for investigating subterranean earth formations and more particularly to a novel method of and improved apparatus for measuring the resistivity of various formations penetrated by a borehole.

In the present practice of drilling oil wells, muds are used during the drilling operations. The weight of the mud is controlled in such manner that the hydrostatic pressure due to the column of drilling mud is usually greater than the internal pressure of the fluid contained in the various formations adjacent the borehole. Under these conditions, the drilling mud or mud filtrate will flow into the permeable formations and will form a mud cake on the walls of the borehole adjacent these particular formations. On the other hand, mud cake will not be formed on the remaining formations adjacent the borehole due to the fact that the mud filtrate does not penetrate the impervious formations.

A number of methods have been proposed to determine the existence of a mud cake of the type described above in order to locate the permeable formations and indicate the possible presence of an oil bearing strata in the subterranean formations. Recently, arrangements have been proposed to determine the existence of the mud cake by electrical resistivity measurements, but such arrangements have generally been characterized by the use of complex equipment and by the production of insufficiently detailed information. Specifically, these well logging arrangements, which have come to be known in the art as a contact log or a "Microlog," employ two or more current electrodes and at least one spaced potential electrode all mounted upon suitable investigation apparatus adapted to be lowered into the borehole. In practice these electrodes are generally connected through separate cable conductors to energizing apparatus and to translating and indicating facilities at the earth's surface in order to provide at least two resistivity measurements at each well depth, one of which is influenced particularly by the material lying in a narrow zone extending laterally from the wall of the borehole and the other of which is affected to a greater degree by the material in the earth formations located beyond the narrow zone. In such systems, it is generally desirable to provide an indication of the natural earth potentials existing in the formations surrounding the borehole simultaneously with these resistivity measurements, and, as a result, still another electrode is generally required on the electrode carrying pads.

One of the primary objects of the present invention is to provide a simplified system in which electrical resistivity measurements are used to determine the presence or absence of mud cake on the walls of the borehole at different well depths.

Another object of the invention is to provide a simple, inexpensively constructed apparatus for obtaining an extremely detailed analysis of the resistivity characteristics of the formations existing at different depths penetrated by the borehole.

It is another object of the invention to concentrate the electrodes of the downhole equipment on a very small surface, thereby to provide for the use of small and efficient apparatus in contact with the walls of the borehole.

It is likewise an object of the present invention to provide a novel method for determining the presence or absence of mud cake on the walls of the borehole at different well depths.

A still further object of the present invention is to obtain simultaneously and at the same borehole depth at least two single electrode resistivity measurements each of which is affected to a different degree by the mud cake formed on the walls of the borehole opposite the pervious subterranean formations.

The foregoing and other objects are realized, in accordance with the present invention, by providing apparatus including at least two electrodes having surface areas of different size in contact with the borehole formations in order to obtain simultaneously at approximately the same borehole depth two single electrode resistivity measurements each of which is affected to a different extent by the presence of mud cake on the walls of the borehole. Each resistivity measurement provides an apparent resistivity which in most cases is different from the true resistivity of the formation due to the influence of the drilling mud, mud cake and mud film. Since the two measurements are affected differently by the factors mentioned above, a difference will exist between them. By properly analyzing these differences with other theoretical and empirical data available, it is possible to reach accurate conclusions concerning the location of the mud cake and, as a result, to determine the physical characteristics of the various formation traversed by the borehole.

The invention both as to its organization and method of operation, together with further objects and advantages, may be best understood by reference to the accompanying drawings in which:

FIG. 1 is a sectional and schematic view illustrating well logging apparatus characterized by the features of the present invention;

FIG. 3 is a sectional view illustrating an alternate arrangement of the resistivity measuring probes in engagement with the wall of the borehole;

FIG. 3A is a front view of the resistivity measuring probes taken along the line 3A—3A in FIG. 3, assuming, of course, that the complete electrode arangement had been shown in the latter;

Figure 4:
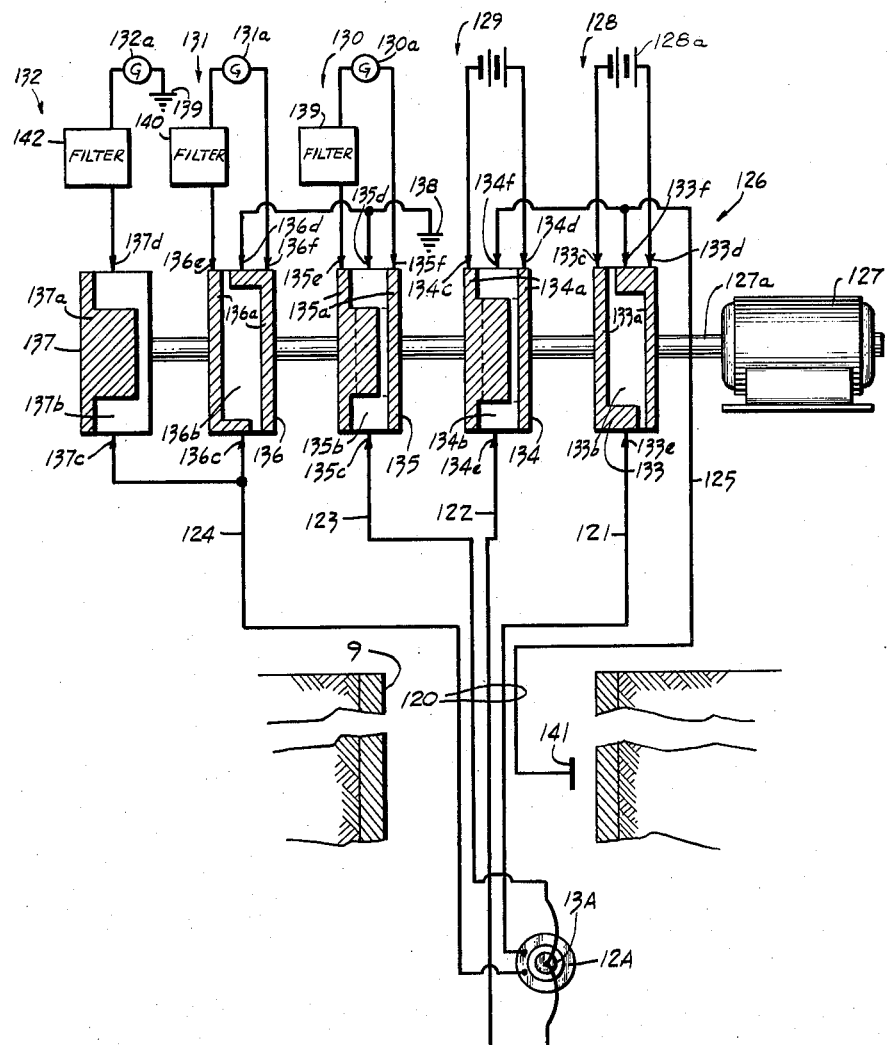
Figure 5:
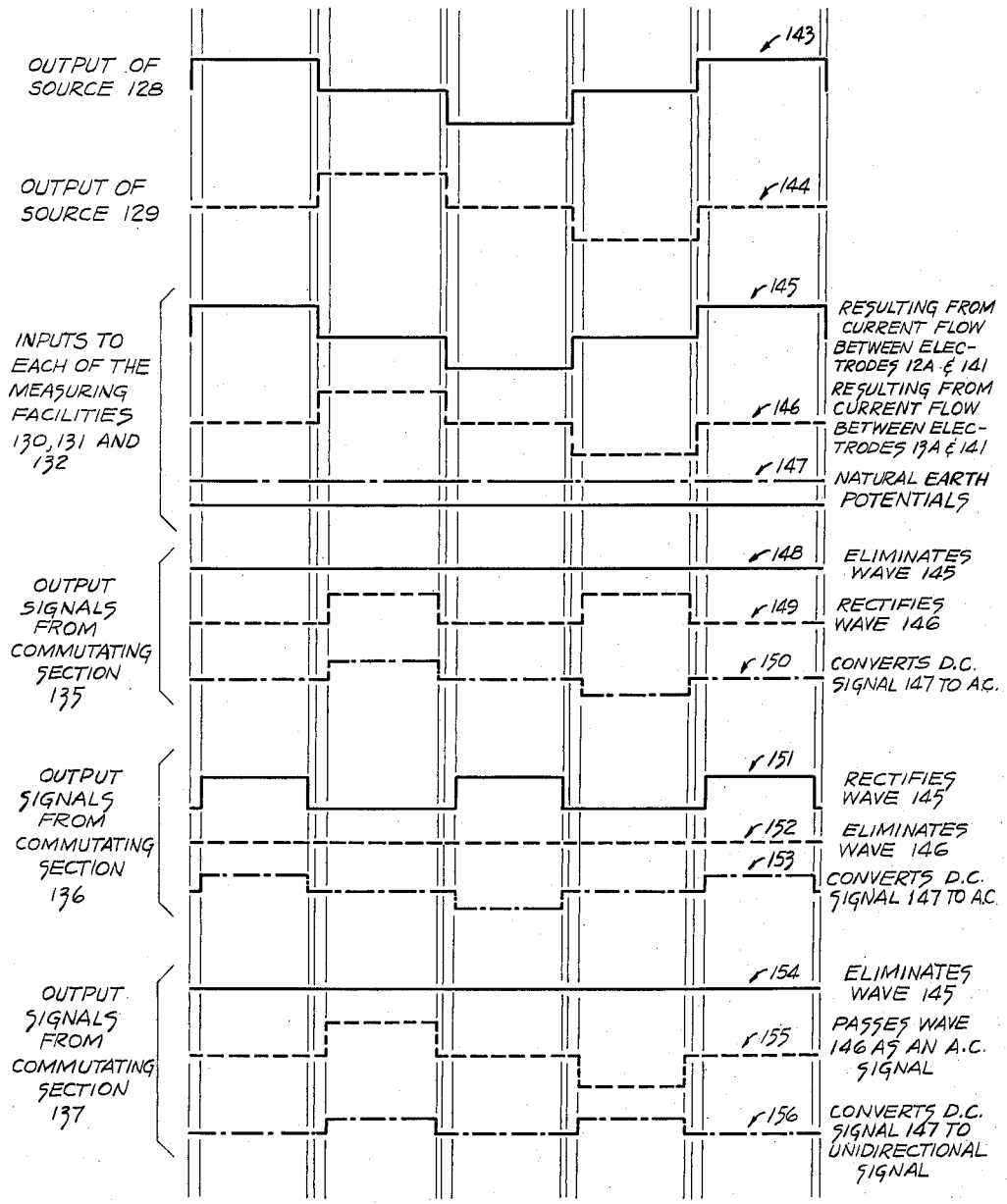

FIG. 4 diagrammatically illustrates an alternative arrangement of apparatus characterized by the features of the present invention; and FIG. 5 shows a group of curves representative of the time relationship existing between signals appearing at various points of the apparatus shown in FIG. 4.

Referring now to the drawings, and more particularly to FIG. 1, downhole equipment or investigation apparatus, indicated generally by the reference character 10, is there illustrated for investigating the characteristics of formations adjacent a borehole 9. The downhole equipment comprises a tubular support or mandrel 11 which is adapted to be supported upon a cable 20 and lowered into the borehole by any conventional means, not shown in the drawings. As is customary in drilling operations, the borehole 9 may contain a column of conducting fluid 8.

Mounted on the tubular support 11 is a spring assembly comprising a plurality of bowed springs 14 and 15, the opposite ends of each of which may be rigidly secured to a pair of collars 16 and 17 mounted for sliding movement on the tubular support 11. The springs 14 and 15 are so shaped that the center section of each is continuously urged towards the wall of the borehole. Stop means 16a and 17a may be carried on the tubular support 11 in order to limit the longitudinal movement of the spring assembly with respect to the tubular support.

The bowed springs 14 and 15 respectively carry wall engaging pad members 14a and 15a which are preferably formed of suitable flexible insulating material such as rubber. Formed in approximately the center of the pads 14a and 15a are recesses of different size preferably circular in shape and respectively designed to accommodate small metallic electrodes 12 and 13 of corresponding shape and size which have been illustrated as circular discs. The electrodes 12 and 13 are so designed that their faces are flush with the outer surface of the flexible pad carrying them. An additional probe electrode 69 may also be placed within a suitable recess on one of the pads such as the pad 15a in the event that it is desired to make measurements of natural earth potential simultaneously with the resistivity measurements to be described hereinafter.

In order to facilitate lowering the downhole equipment to any desired depth in bore holes of small diameter, it is desirable to provide means for locking one of the spring collars, for example, the collar 16, to the tubular support 11 at sufficient distance from the other collar 17 that the pads 14a and 15a will be maintained out of engagement with the wall of the borehole 9. To this end, the collar 16 is moved longitudinally along the tubular support 11 until it is oriented below a hole 11a extending transversely of the tubular support. A metallic plug 18 is then inserted into the hole 11a with end of the plug, which protrudes beyond the surface of the tubular member 11, in engagement with the upper edge of the collar 16 in order to prevent the collar from returning to its normal position. An igniter including a charge of powder is then inserted into an enlarged recess 11b formed in the tubular support 11 adjacent the hole 11a and is retained therein by any suitable means such as a threaded plug not shown in the drawing. This igniter is connected electrically to a conductor 21 in the cable 20 whereby it can be exploded at any desired time by control mechanism at the surface equipment, thereby to discharge the plug 18 and allow the collar 16 to slide along the tubular member 11 until the pads 14a and 15a engage diametrically opposed portions of the wall of the borehole 9.

In field operation, electrodes 12 and 13 are energized from the surface equipment with a constant current which flows from a source of alternating current 78 through a D.C. blocking condenser 46 and through one of the cable conductors, such as conductor 21, to the downhole equipment 10. The source 78 is adapted to provide alternating current signals having any desired frequency, which may be in the order of 400 cycles, for applying a difference of potential between each of the electrodes 12 and 13 and ground 78a preferably connected to the outer sheath or armor of the cable 20. Energization of the electrodes 12 and 13 induces a constant current flow from each of these electrodes through the borehole formations to the outer sheath of the cable 20 or, in the alternative, to a remotely located electrode (not shown in the drawings) which may be inserted into the borehole. With a constant current flowing from the electrodes 12 and 13, a potential measurement is made simultaneously between each electrode and an electrically remote reference point 41 which may be located either within the borehole as illustrated in FIG. 1 or may be positioned at the surface. In any event, the remote electrode 41 is positioned at sufficient distance from the electrodes 12 and 13 that its effect thereon is negligible. Thus, the two potential measurements described above are each proportional to the contact or electrode resistance of the respective electrodes, which in turn is affected by the formation resistivities encountered as the downhole equipment 10 is moved within the borehole.

It will be observed that the electrodes 12 and 13 are located at the same longitudinal position along the tubular support 11 and, in effect, provide single point resistivity measurements. In single point resistance logging, it is known that a spacing between a downhole current electrode and a remote electrode in excess of about ten times the diameter of the current electrode produces a potential difference between the two electrodes which is essentially a function solely of the contact or electrode resistance of the current electrode. Moreover, in such logging operations, the material existing in the formations in a zone relatively close to the current electrode controls its contact resistance while the influence of the formations beyond this zone is negligible for all practical purposes. In general, only the material comprised within an imaginary sphere surrounding the current electrode and having a radius several times the diameter of that electrode is found to have any effect on the electrode resistance.

In accordance with the present invention, the potential measurements between electrodes 12 and 13 and remote electrode 41 are simultaneously recorded by resistivity measuring circuits or recording facilities 54 and 64 of the surface equipment in a manner to be described in detail hereinafter. Specifically, the potential difference existing between electrode 12 and remote electrode 41 is applied through a signal transmission channel 40 FIG. 2) in the downhole equipment and through cable conductor 23 to the recording facilities 54 in order to produce a first resistivity measurement while the potential difference existing between subsurface electrode 13 and remote electrode 41 is applied through a signal transmission channel 70 in the downhole equipment and through cable conductor 22 to the indicating facilities 64 in order to produce a second resistivity measurement. The measurements produced by facilities 54 and 64 are representative of the electrical resistivity of the earth formations as measured by electrodes having different surface areas in contact with the formations and having corresponding differences in their contact or electrode resistance. Since the surface area of the electrode 13 is several times smaller than the surface area of the electrode 12, the contact or electrode resistance of the latter will be particularly influenced by the material existing in a zone immediately surrounding the electrode 12 while the electrode 13 will be influenced by material existing in a somewhat larger zone. The mud cake, which exists primarily in the zone affecting the electrode 12, thus, has greater influence on the resistivity curve produced by the indicating facilities 54 than it has on the curve produced by the facilities 64. This, of course, means that the ratio of apparent resistivity to true resistivity will be different for the two measurements at all borehole depths where mud cake is present on the wall and, as a result, a departure will appear between the curves produced by the facilities 54 and 64 at those depths corresponding to the mud cake formations.

As previously indicated, the natural earth potentials appearing between electrode 69 and a remote surface electrode 79 may be applied through cable conductor 21 to indicating and recording facilities 80 at the earth's surface in order to produce a self potential curve simultaneously with the two resistivity curves described above. From the foregoing description, it is apparent that the insulating pads 14a and 15a may be made relatively small due to the fact that they respectively carry only one electrode on the pad 14a and two electrodes on the pad 15a with the result that these pads are especially efficient in eliminating the presence of the mud and fluid between the engaging pad and the wall of the borehole. Thus, the fluid and mud is prevented from establishing a low resistance path for an undesired flow of current between the electrodes.

Figure 2:
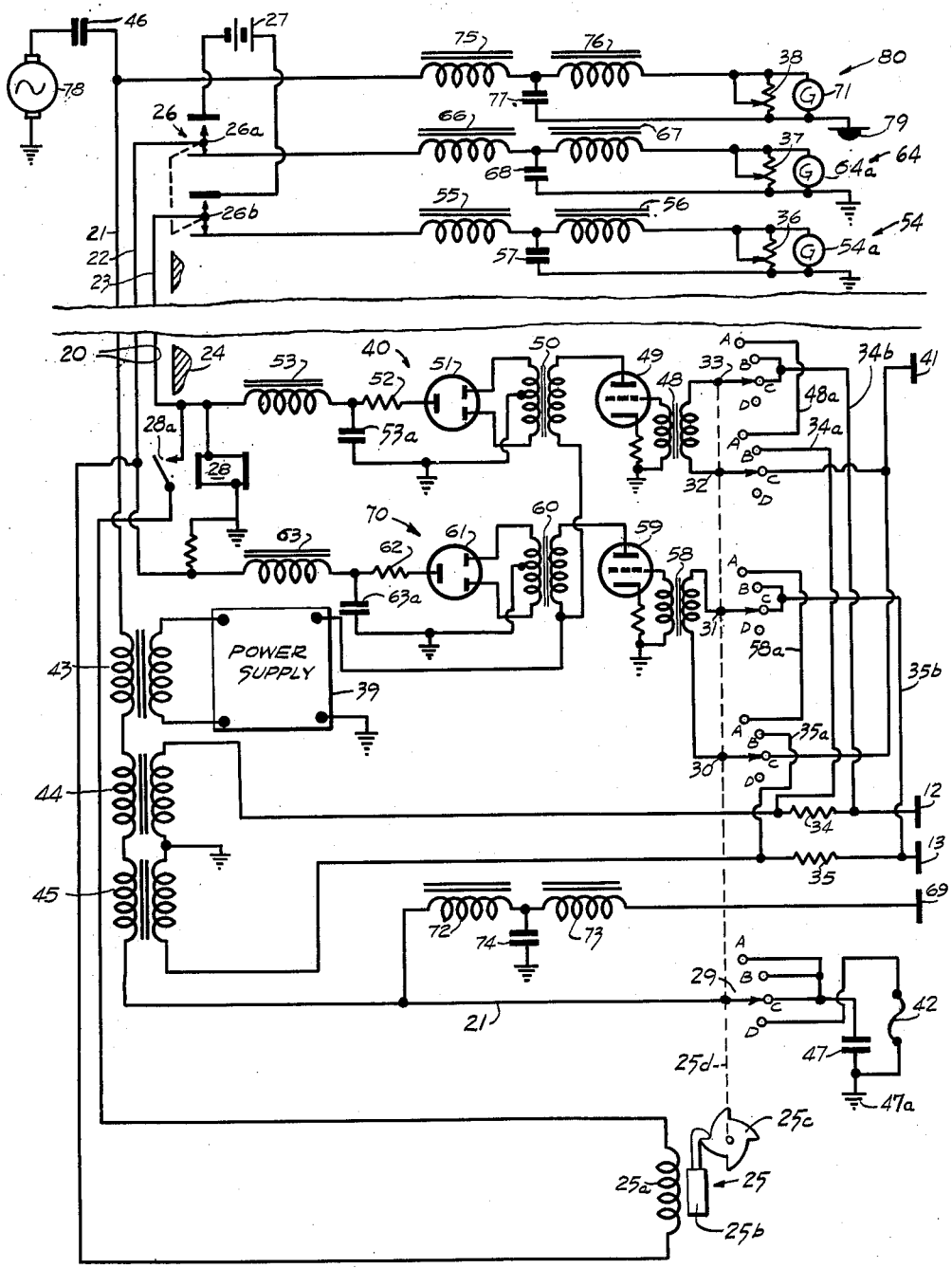
FIG. 2 is a schematic diagram showing one particular electrical circuit which may be employed in the apparatus of the present invention.

Turning now to the schematic diagram shown in FIG. 2 for a description of a particular circuit arrangement which may be employed in making the various measurements described above, apparatus is there shown comprising the cable 22, illustrated as including three conductors 21, 22, and 23 within an outer sheath or armor 24 of steel or other conducting material, for connecting the surface facilities and the downhole equipment. The downhole equipment 10, as described above, includes the electrode 13 carried upon insulating pad 14a and the electrodes 12 and 69 carried upon the insulating pad 15a.

In order to provide for effective control of the operation of the apparatus shown in FIG. 2 from the surface, there is provided in the downhole equipment a solenoid operated switch 25 selectively energized from the surface by a manually operated switch 26. When the switch 26 is momentarily moved from the position shown in FIG. 2 to bring its contacts 26a and 26b into engagement with the poles of a battery 27, D.C. switching voltage is applied across a high resistance sensitive relay 28 in the downhole equipment through cable conductors 22 and 23. The voltage applied across the relay 28 is, of course, sufficient to cause its energization in order to close its contacts 28a and apply the switching voltage across low resistance coil 25a of the solenoid operated switch 25. After the solenoid operated switch 25 has been actuated by momentary closure of the switch 26, the latter is released. Each time the switching voltage is applied across the coil 25a by closing the switch 26, switches 29, 30, 31, 32, and 33, in the downhole equipment are advanced one step in synchronism due to the fact that each actuation of the solenoid coil causes armature 25b to rotate a ratchet wheel 25c through one-quarter of a revolution. The ratchet wheel 25c, as indicated by the dotted line 25d in FIG. 2, is mechanically coupled to the blades of the switches 29 to 33, inclusive.

When the switch blades occupy the position designated A in FIG. 2, the switches 32 and 33 cooperate with connector 48a to place a short circuit across the primary winding of transformer 48 while switches 30 and 31 cooperate with connector 58a to short circuit the primary winding of transformer 58. Since the transformers 48 and 58 respectively supply input signals to amplifiers 49 and 59 for energizing the resistance measuring circuits 54 and 64 of the surface equipment, it will be observed that, with the switches in A position, these measuring circuits may be set to zero to facilitate calibration in the manner described hereinafter.

After the zero position of the metering circuits 54 and 64 has been established, the switch 26 is again actuated in order to move the switches 29 to 33, inclusive, to the B position wherein calibration signals respectively developed across resistors 34 and 35 are supplied to each of the signal transmission channels 40 and 70 as described more fully below. Specifically, with the switch 29 in the B position current flows from the source 78 through the conductor 21, through the primary windings of transformers 43, 44, and 45 and through blocking condenser 47 to the outer sheath or armor 24 of the cable 20. The flow of current through the primary winding of transformer 43 energizes power supply 39 in order to induce the latter to supply operating potentials and filament voltage for the vacuum tubes embodied in the signal transmission channels 40 and 70 of the downhole equipment.

The flow of current through the primary windings of transformers 44 and 45 energizes the secondary windings of these transformers and causes constant current to flow through resistors 34 and 35 to the electrodes 12 and 13 and return to transformers 44 and 45 through the earth formations and the armor 24 of the cable. When the switches 32 and 33 occupy the B position the resistor 34 is connected by signal connectors 34a and 34b in parallel with the primary winding of transformer 48. In similar manner, switches 30 and 31 cooperate with signal connectors 35a and 35b shunt the primary transformer 58 by the resistor 35 when the switches are in the B position. Since the current through the resistors 34 and 35 is maintained at constant value by means of constant current generator 78, the potential drops across these resistors will be independent of the particular type formations encountered by the electrodes 12 and 13. Accordingly, the amplitudes of the signals applied across the input windings of transformers 48 and 58 when the switches are in the B position are dependent almost exclusively upon the values of the resistances 34 and 35 and, of course, upon the magnitude of the current delivered by source 78. The resistors 34 and 35 may be so selected that the voltage drop across them simulates or represents a definite value in ohm-meters of the resistivity of the formations as measured by the electrodes.

As indicated above, the signals applied across the primary windings of transformers 48 and 58 are transmitted through signal transmission channels 40 and 70 and through cable conductors 23 and 22 to the measuring circuits 54 and 64 of the surface equipment. With input signals of predetermined amplitude impressed across the input terminals to the measuring circuits 54 and 64, control potentiometers 36 and 37 connected in parallel with recording galvanometers 54a and 64a may be adjusted to effect a desired galvanometer deflection, thereby calibrating the recording instruments.

Position D of the switches 29 to 33, inclusive, is employed to release the mechanism holding the pads 14 and 15 out of engagement with the walls of the borehole. Thus, when the switch 29 is moved to the D position, the alternating current supplied from the source 78 through conductor 21 traverses the fuse wire 42 in order to ignite the powder behind the plug 18 holding the spring assembly of the downhole equipment in cocked position. Ignition of the powder causes ejection of the plug from the tool, thus releasing the bowed springs 14 and 15 to bring the pads 14a and 15a into engagement with the walls of the borehole.

After the pads 14a and 15a have been moved into engagement with the walls of the borehole and after the recording galvanometers 54a and 64a have been properly calibrated in the manner described above, the switch 26 at the surface equipment is successively energized to apply D.C. switching voltage across the solenoid coil 25a until the switches 29 to 33, inclusive, are moved to the position marked C. In the latter position, the switch 29 again connects the conductor 21 to the cable armor through the blocking condenser 47 in order to induce a flow of alternating current through the series connected primary windings of transformers 43, 44, and 45. The current flow through the primary winding of transformer 43 energizes the power supply 39 for the purpose described above while the current flow through the transformers 44 and 45 again produces a flow of current between each of the electrodes 12 and 13 and the cable armor. The switch 33 in the C position connects one side of the primary winding of transformer 48 through signal connector 34b to the electrode 12 while, at the same time, the switch 32 connects the other side of the primary winding of this transformer to the remote electrode 41. The switch 31 in the C position connects one side of the primary winding of transformer 58 through signal connector 35b to electrode 13 while the switch 30 connects the other side of this transformer winding to the remote electrode 41. Thus, the potential difference existing between the electrode 12 and the remote electrode 41 as a result of current flow from the electrode 12 to the cable armor 24 is applied across the primary winding of transformer 48 while, at the same time, the difference of potential existing between electrode 13 and remote electrode 41 as a result of current flow from electrode 13 to the cable armor 24 is applied across the primary winding of transformer 58.

The secondary windings of the transformers 48 and 58 respectively supply input signals to the control grids of the amplifiers 49 and 59 embodied in the signal transmission channels 40 and 70. These input signals are amplified and applied through output transformers 50 and 60 to rectifiers 51 and 61, respectively. The signals developed by the rectifier 51 are passed through a low pass filter section, comprising resistor 52, choke coil 53 and condenser 53a, in order to provide a D.C. signal for application through cable conductor 23 to the resistivity measuring circuit 54. The direct current signal applied to the latter resistivity measuring circuit is passed through a low pass filter section, comprising choke coils 55 and 56 and condenser 57, in order to eliminate undesired alternating current signals which may be coupled to the conductor 23 through the mutual inductance and capacitance existing between conductors in the cable.

The rectified signals developed by rectifier 61 are passed through a filter section, comprising resistor 62, choke coil 63 and capacitor 63a, in order to provide a D.C. signal for transmission through conductor 22 to the resistivity measuring circuit or indicating facilities 64. A low pass filter, comprising inductors 66 and 67 and condenser 68, at the input of the resistivity measuring circuit 64 eliminates undesired alternating current signals coupled to the direct current signals during their passage up the borehole through the conductor 22, and hence, produces a direct current signal for application to the recording galvanometer 64a. It will be understood that the recording instruments 54a and 64a may be of any suitable type adapted to record signals upon recording mediums associated therewith. These recording mediums are driven in correlation with the mechanism raising and lowering the downhole equipment and, as a result, the records produced by the recording facilities 54 and 64 present a continuous log of the resistivities of the borehole formations as a function of borehole depth. The recording galvanometers 54a and 64a respectively provide indications representative of the differences of potential existing between the subsurface electrode 12 and remote electrode 41 and between the subsurface electrode 13 and remote electrode 41. Since the electrode 41 is remotely positioned with respect to electrodes 12 and 13, the measurements provided by recording galvanometers 54a and 64a are in effect single point resistance measurements indicative of the resistivity of the borehole formations engaged by the electrodes 12 and 13. It will be understood that the switches 29 to 33, inclusive, remain in the C position while the downhole equipment 10 is moved in any desired direction through the borehole 9 thereby providing continuous resistivity measurements of the borehole formations which, as indicated above, are preferably displayed as a pair of resistance curves oriented in side by side positions for comparison and analysis.

As previously indicated, the difference in diameter between electrodes 12 and 13 causes the resistivity measurements produced by the recording galvanometers 54a and 64a to be affected to different degrees by the mud cake existing along the borehole wall adjacent the pervious formations. Thus, the ratio of the apparent resistivity to the true resistivity of the measurements produced is different at those depths within the borehole where mud cake is present with the result that the two curves produced by the recording galvanometers 54a and 64a will exhibit curve departures at those particular borehole areas.

In order to produce a natural earth potential curve simultaneously with the two resistance curves obtained from recording galvanometers 54a and 64a, there is provided the additional probe electrode 69 mounted upon one of the insulating pads, carried by the downhole equipment such, for example, as the pad 15a. Specifically, the direct current natural earth potentials existing between the subsurface electrode 69 and the ground electrode 79 at the various borehole depths are continuously measured by the self potential indicating circuit 80 of the surface equipment. To this end, the natural earth potentials present at the electrode 69 are passed through a low pass filter section, comprising inductors 72 and 73 and condenser 74, in the downhole equipment in order to eliminate alternating current signals which may appear between the electrode 69 and the ground electrode 79. The output signals of this filter section, comprising direct current signals representative of the natural earth potentials, are passed through cable conductor 21 to the self potential indicating circuit 80 of the surface equipment. A low pass filter, comprising inductors 75 and 76 and condenser 77, in the self potential measuring circuit 80 prevents the alternating current signals generated by the source 78 from reaching recording galvanometer 71 and, hence, insures that this galvanometer will respond solely to the direct current differences of potential existing between the subsurface electrode 69 and surface electrode 79. The blocking condenser 46 prevents the self potential D.C. signal on conductor 21 from being short circuited through the ground connection 47a and at the same time allows the required A.C. power to flow to the subsurface equipment. It will be apparent that the recording galvanometer 71 produces a continuous indication of the natural earth potentials existing in the borehole formation as the downhole equipment is moved within the borehole. This self potential curve is thus correlated with the resistivity curves produced by the galvonometers 54a and 64a and, hence, facilitates the analysis and interpretation of the recorded information. In order to provide for calibration of the self potential recording circuit 80 there is provided an adjustable control means comprising potentiometer 38 connected in parallel with the recording galvanometer 71.

From the foregoing explanation, it will be observed that the electrodes 12 and 13 illustrated in FIG. 1 are positioned at approximately the same bore-hole depth but are in engagement with diametrically opposed portions of the borehole 9. With this relatively large separation between the electrodes 12 and 13 the difference of potential existing between electrode 12 and remote electrode 41 is substantially unaffected by the field created in the borehole formations as a result of current flow between the electrode 13 and the cable armor 24. In like manner, the potential difference between electrode 13 and remote electrode 41 is substantially unaffected by the field established in the borehole formations as a result of current flow from electrode 12 to the cable armor 24. Thus, the curves produced by the resistivity measuring circuits 54 and 64 will exhibit the desired resistivity measurements and will not be subject to undesired interference. It should also be observed that the apparatus illustrated in FIGS. 1 and 2 provides for the simultaneous production of two resistivity curves and a self potential curve while employing a cable including only three conductors extending from the downhole equipment to the surface.

Under certain circumstances, it may be desirable to employ an electrode assembly of the type illustrated in FIGS. 3 and 3A, wherein concentrically arranged probes or electrodes 12A and 13A are assembled upon a common insulating pad 15a. As there illustrated, the electrode 13A may comprise a solid circular disc while the electrode 12A may comprise a flat circular ring surrounding the electrode 13A. The electrodes are so designed that the surface area of the electrode 12A in engagement with the walls of the borehole 9 is several times greater than the surface area of the electrode 13A. As indicated above, both of these electrodes are mounted upon a common insulating pad 15a carried by the bowed spring 15 of the downhole equipment. If desired, an additional electrode may be provided on the insulating pad for facilitating the production of a natural earth potential curve but this electrode has not been shown in the drawings.

Since the arrangement shown in FIGS. 3 and 3A employs only two concentric and relatively small electrodes, it is possible to employ an insulating pad of very small size in engagement with the walls of the borehole 9. Such a pad provides better contact with the wall of the borehole and is, therefore, more efficient in eliminating the influence of the drilling mud or mud film which tends to collect on the walls of the borehole opposite the impervious formations. As a result, the resistivity measurements effected by the electrodes 12A and 13A are somewhat more detailed than the measurements effected by the use of the facilities illustrated in FIG. 1.

In the event that the electric field created by the current flow from each of the electrodes 12A and 13A induces an undesired response in the other electrode, it may be desirable to employ equipment of the type illustrated in FIG. 4 for energizing the electrodes and producing the desired resistivity measurements. The equipment there illustrated is preferably employed when the resistivity probes or electrodes are positioned close together since this equipment provides for separate energization of the electrodes and also provides for the effective separation of the signals collected by these electrodes. Specifically, the equipment shown in FIG. 4 includes downhole apparatus comprising a pair of concentrically arranged probes or electrodes 12A and 13A which may be of the type illustrated in FIGS. 3 and 3A. At should be understood that this electrode arrangement is merely illustrative and that, accordingly, the equipment shown in FIG. 4 may be employed in any system wherein the downhole electrodes are oriented in proximity to each other in the downhole equipment. The electrodes 12A and 13A are mounted upon a suitable insulating pad which is pressed into engagement with the walls of the borehole by any suitable mechanism such, for example, as the spring assembly shown in FIG. 1.

Each of the electrodes 12A and 13A is connected to the surface equipment through two conductors of a multi-conductor cable 120 extending from the downhole equipment through the borehole to the earth's surface. Specifically, the electrode 12A is connected through cable conductor 121 to a source of periodically reserved current indicated generally by the reference character 128 while this same electrode is also connected through cable conductor 124 to resistivity measuring facilities indicated generally by the reference numeral 131. In similar manner, the electrode 13A is connected through cable conductor 122 to a source of periodically reversed current indicated generally by the reference numeral 129 and through cable conductor 123 to resistivity measuring facilities indicated generally by the reference numeral 130.

In order to provide for measurement of the natural earth potentials existing in the borehole formations simultaneously with the resistivity measurements produced by the facilities 130 and 131, cable conductor 124 is preferably connected to self potential indicating apparatus indicated generally by the reference numeral 132. The two sources of periodically reversed current, 128 and 129 and the indicating facilities 130, 131 and 132 are all operated in time correlation since each of these devices includes one of the commutating sections of a commutator 126. As indicated above, this commutator comprises a plurality of commutating sections designated by the reference numerals 133 to 137, inclusive, all of which are mounted upon a shaft 127a driven at substantially constant speed by a motor 127 as the downhole equipment is moved within the borehole.

As indicated above, the source of current 128 is adapted to induce a periodically reversed current flow between the downhole electrode 12A and a remote electrode 141 which is connected through cable conductor 125 to the commutating sections 133 and 134. Moreover, the source of current 129 is adapted to induce a flow of periodically reversed current between the electrode 13A and the remote electrode 141. The indicating facilities 130 including the commutating section 135 are designed to respond solely to the potential difference existing between the subsurface electrode 13A and a remote electrode 138 illustrated as a ground electrode. The commutating section 135 cooperates with a low pass filter 139 embodied in the indicating facilities 130 to eliminate both the natural earth potentials appearing between the electrode 13A and ground electrode or reference point 138 and to eliminate any difference of potential existing between these two electrodes as a result of current flow between the electrodes 12A and 141.

In similar manner, the indicating facilities 131 are adapted to respond solely to the difference of potential existing between the downhole electrode 12A and the reference point or ground electrode 138 as a result of current flow between the electrodes 12A and 141. The commutating section 136 cooperates with the filter 140 in a manner to be described more fully hereinafter to eliminate natural earth potentials existing between the electrode 12A and remote electrode 138 and also to eliminate any alternating current signals existing between these two electrodes as a result of current flow between electrodes 13A and 141. The rotary interrupter or commutating section 137 cooperates with filter 142 to eliminate the two alternating current signals appearing between electrode 12A and reference point 138 as a result of the respective current flows between the electrodes 12A and 13A and the remote electrode 141 in order to insure that the self potential measuring apparatus 132 will respond solely to the natural earth potentials collected by the electrode 12A.

Turning now to a description of the operation of the source 128 to produce the periodically reversed current described above, it will be observed that this source includes a D.C. supply source 128a having its opposed terminals connected to input brushes 133c and 133d in continuous engagement with two spaced conducting portions 133a of the commutating section 133. Thus, the brushes 133c and 133d constantly apply a D.C. difference of potential across the conducting portions of commutating section 133. Output brushes 133e and 133f in engagement with diametrically opposed peripheral portions of the commutating section 133 are each connected in sequence first to one of the input brushes, next to insulating portion 133b and then to the other input brush with the result that electrical connection between each of the output brushes and the input brushes is periodically reversed. Since the output brushes 133e and 133f are respectively connected to the subsurface electrode 12A and to the remote electrode 141 through cable conductors 121 and 125, it will be apparent that a periodically reversed square wave current will flow between these two electrodes through the formations adjacent the borehole having a time relationship as indicated by the wave 143 shown in FIG. 5.

In similar manner, the source 129 causes a periodically reversed square wave current to flow between the subsurface electrode 13A and remote electrode 141 having a wave shape resembling the wave 144 shown in FIG. 5. Since the conducting portions of the commutating sections 133 and 134 are identical in shape but are oriented upon the shaft 127 in angular positions displaced 90° from each other, it will be observed that the currents from the electrodes 12A and 13A flow alternately for equal periods with only one current flowing at any particular time.

As a result of the two periodically reversed currents flowing between each of the electrodes 12A and 13A and the remote electrode 141, there exist between each of the electrodes 12A and 13A and remote electrode 138 two alternating current square wave signals represented by the curves 145 and 146 shown in FIG. 5. The natural earth potentials existing at the various depths traversed by the borehole also appear between each of the electrodes 12A and 13A and the remote electrode 138 as represented by the direct current wave 147 in FIG. 5. It should be appreciated that, although the waves 145 and 146 have been illustrated as having identical amplitudes, this is not necessarily the case, since in actual practice the different contact resistances of the electrodes 12A and 13A will cause the amplitudes of these waves to vary to some extent. Moreover, the currents produced by the sources 128 and 129 do not necessarily possess identical amplitudes. In any event, the input to each of the indicating facilities 130, 131 and 132 comprises a pair of periodically reversed square wave signals 145 and 146 and the direct current natural earth potentials 147. These signals are applied across input brushes 135c and 135d in engagement with diametrically opposed portions of the periphery of commutating section 135. The conducting portions 135a of commutating section 135 are oriented in a position on the shaft 127a corresponding to the angular location of conducting portion 134a and, accordingly, the input brushes 135c and 135d are in engagement with their associated conducting portions during approximately the same interval when the current source 129 is operative to induce a flow of current between electrodes 13A and 141. However, the conducting portions 135a are preferably somewhat smaller than the conducting portions 134a with the result that the brushes 135c and 135d are engaged for only a portion of the interval when the current source 129 is effective. As a result of the decreased size of conducting portions 135a, the indicating facilities 130 are maintained inoperative during transient periods caused by the reversal of current flow from the sources 128 and 129, thereby to prevent high amplitude transients from entering the measuring apparatus 130. The output of commutating section 135 is developed across output brushes 135e and 135f in continuous engagement with the conducting portions of this commutating section. Since the output brushes 135e and 135f are alternately brought into engagement with first one and then another of the input brushes 135c and 135d by rotation of the commutating section 135 in time correlation with the current flow from source 129, the commutating section 135 functions to rectify the periodically reversed signal appearing between subsurface electrode 13A and remote electrode 138 as a result of current flow between the electrode 13A and 141, i.e., the signal represented by wave 146. The result of the described rectification is to produce across brushes 135e and 135f a unidirectional signal represented by the wave 149 shown in FIG. 5. Since the input brushes 135c and 135d are in engagement with the insulating portion 135b during all of the intervals when the source 128 is effective, the input signal to commutating section 135 resulting from current flow between electrodes 12A and 141, i.e., the signal represented by wave 145, is eliminated as indicated by the straight line 148 shown in FIG. 5. The periodic reversal of electrical contact between the input and output brushes of commutating section 135 converts the natural earth potentials existing between electrode 13A and remote electrode 138 to a periodically reversed square wave represented by the wave 150 shown in FIG. 5. The unidirectional signal appearing across brushes 135e and 135f is smoothed by the filter 139 in order to provide a D.C. signal for energizing recording galvanometer 130a of the indicating facilities 130 while, at the same time this filter, rejects the wave 150. As a result, the recording galvanometer provides a continuous single electrode measurement of the resistivity of the formations adjacent electrode 13A.

In similar manner, the three input signals represented by waves 145, 146, and 147 to the commutating section 136 are applied across input brushes 136c and 136d. The conducting portions 136a of the latter commutating section are identical in size and shape to the conducting portions 135a but are located in different angular position upon the shaft 127a whereby they render the indicating facilities 131 operative at approximately the same interval when the source 128 is effective. Commutating section 136 functions in a manner similar to the commutating section 135 described above to develop between output brushes 136e and 136f a unidirectional signal resulting from rectification of the input signal represented by wave 145. This unidirectional signal is illustrated by the wave 151 shown in FIG. 5 and is indicative of the difference of potential existing between subsurface electrode 12A and remote electrode 138A as a result of current flow between the electrodes 12A and 141. The unidirectional signal appearing across brushes 136e and 136f is smoothed by the filter 140 in order to develop a D.C. signal for application to the recording galvanometer 131a. As a result, the recording galvanometer provides a continuous single electrode measurement of the resistivity of the different formations engaged by the electrode 12A as the downhole equipment is moved through the borehole.

The periodic reversal between input and output brushes of commutating section 136 converts the natural earth potentials existing between electrode 12A and remote electrode 138 to an alternating current periodically reversed wave represented by the curve 153 shown in FIG. 5 which wave is rejected by filter 140. Since the brushes 136c and 136d are both in engagement with the insulating portion 136b during all of the intervals when the source 129 is effective, the difference of potential existing between electrode 12A and remote electrode 138 as a result of current flow between the electrodes 13A and 141, i.e., the input signal represented by wave 146, is eliminated as illustrated by the straight line 152 shown in FIG. 5.

The signals appearing between subsurface electrode 12A and ground electrode 139 are applied through cable conductor 124 across brushes 137c and 137d of the commutating section 137 embodied in the self potential indicating facilities 132. The conducting portion 137a of the latter commutating section is operated in synchronism with the conducting portions of commutating section 135 but, in contrast to the operation of the latter commutating section, the section 137 does not effect the periodic reversal of the electrical circuit between its input and output terminals. Thus, the brushes 137c and 137d are electrically connected through the conducting portion 137a twice during each complete revolution of the shaft 127a. The brushes 137c and 137d engage the insulating portion 137b during all of the intervals when the current source 128 is effective to induce a flow of current between electrodes 12A and 141 and, accordingly, the A.C. signal appearing between the electrode 12A and ground electrode 139 as a result of this current flow, i.e., the input signal represented by wave 145, is eliminated by the rotary interrupter 137, as indicated by the straight line 154 shown in FIG. 5. The A.C. difference of potential existing between electrodes 12A and 139 as a result of current flow between the electrodes 13A and 141, i.e., the signal represented by wave 146, is passed by the commutating section 137 as a periodically reversed square wave signal illustrated by the wave 155 shown in FIG. 5. The D.C. natural earth potentials existing between electrode 12A and ground electrode 139 are converted by the commutating section 137 to a unidirectional signal represented by the wave 156. The latter unidirectional signal is smoothed by the filter 142 in order to provide a D.C. signal for energizing recording galvanometer 132a of the self potential measuring facilities 132. The filter 142 also functions to eliminate the A.C. signal represented by the wave 155 and, as a result, prevents this signal from affecting the indication appearing on the recording galvanometer 132a. As a result, the recording galvanometer 132a provides a continuous indication of the natural earth potentials existing in the various borehole formations engaged by the electrode 12A.

In certain installations, it may be desirable to employ a separate electrode in the subsurface equipment for producing the self-potential curve, particularly in those instances where the effects of polarization of the current flowing through the electrode 12A are severe. In such installations, of course, an additional cable conductor will be required to connect the "self potential" electrode to the surface equipment.

From the foregoing explanation, it will be apparent that the apparatus illustrated in FIG. 4 provides simultaneously a natural earth potential curve and two resistivity curves while employing only two electrodes spaced close together on a small insulating pad. Furthermore, the described apparatus enables the use of electrodes spaced extremely close together while at the same time facilitating the separation and identification of the various signals affecting these electrodes. Due to the difference in surface area between the electrodes 12A and 13A, the resistivity measurements are affected to different degrees by the mud cake formed adjacent the pervious formations on the wall of the borehole. Accordingly, the two resistivity curves produced by the measuring facilities 130 and 131 exhibit a departure at regions corresponding to the depths of the borehole where mud cake is present. By analyzing and interpreting the two curves produced by the measuring facilities 130 and 131 in conjunction with the natural earth potential curve produced by the measuring facilities 132, a reliable and accurate analysis of the nature of the subterranean formations is possible.

The signals appearing between each of the subsurface electrodes 12A and 13A and their associated remote reference points may also be effectively separated and measured by employing energizing and measuring apparatus of the type shown in copending application Serial No. 483,751, of Henry C. Waters, filed January 24, 1955, and assigned to the same assignee as the present invention. Apparatus disclosed and claimed in this application comprises sources for separately energizing current electrodes of the subsurface equipment with periodically reversed currents of different frequency. Separate measuring and indicating devices of the surface equipment are respectively rendered operative in time correlation with the periodic reversals of the different currents supplied to the subsurface electrodes in order to facilitate separation and measurement of the potential differences resulting from the different currents flowing through the borehole formations.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. In well logging apparatus, the combination of downhole equipment including insulating structure, a cable including a plurality of conductors supporting said equipment for movement through the well, at least two electrodes carried by said insulating structure and coupled to respective ones of said plurality of conductors, means for establishing mechanical and electrical contact between the electrodes and the wall of the well, said electrodes having exposed surface portions of different area facing the wall of the well at approximately the same well depth, means for passing electric current of predetermined magnitude between each of said electrodes and a reference point spaced apart therefrom, a first potential responsive circuit connected through at least one of said cable conductors to receive a first potential difference existing between a first of said electrodes and a reference point spaced apart therefrom as a result of current flow from said first electrode, a second potential responsive circuit connected through another of said cab e conductors to receive a second potential difference existing between the second of said electrodes and a reference point spaced apart therefrom as a result of current flow from said second electrode, said first and second potential differences being influenced to different degrees by the electrical resistivity of the material existing in a narrow zone extending laterally and outwardly of the wall of the well, and means for recording the differences of potentials received by said first and second potential responsive circuits.

2. In well logging apparatus, the combination of downhole equipment including insulating structure, a cable including a plurality of conductors supporting said equipment for movement through the well, at least two electrodes carried by said insulating structure and coupled to respective ones of said plurality of conductors, means for urging said structure laterally of the well in order to bring the electrodes into engagement with the wall of the well, said electrodes having exposed surface portions of different area facing the wall of the well at approximately the same well depth, means for passing electric current of predetermined magnitude between each of said electrodes and a reference point spaced apart therefrom, a first potential responsive circuit connected through at least one of said cable conductors to receive a first potential difference existing between a first of said electrodes and a reference point spaced apart therefrom as a result of current flow from said first electrode, a second potential responsive circuit connected through another of said cable conductors to receive a second potential difference existing between the second of said electrodes and a reference point spaced apart therefrom as a result of current flow from said second electrode, said first and second potential differences being influenced to different degrees by the electrical resistivity of the material existing in a narrow zone extending laterally and outwardly of the wall of the well, means for recording the differences of potentials received by said first and second potential responsive circuits, a signal transmitting system including one of said cable conductors for transmitting signals indicative of the natural earth potentials at different well depths to the surface, and means at the surface for recording said signals simultaneously with the recordings of said first and second potential differences.

3. In well logging apparatus, the combination of downhole equipment including at least one insulating member, a cable including a plurality of conductors supporting said equipment for movement through the well, at least two electrodes carried by said insulating member and coupled to respective ones of said plurality of conductors, means for urging said member laterally of the well in order to bring the electrodes into engagement with the wall of the well, said electrodes being concentrically arranged on said insulating member and having exposed surface portions of different area facing the wall of the well at the same well depth, means for passing electric current of predetermined magnitude between each of said electrodes and a reference point spaced apart therefrom, a first potential responsive circuit connected through at least one of said cable conductors to receive a first potential difference existing between a first of said electrodes and a reference point spaced apart therefrom, as a result of current flow from said first electrode, a second potential responsive circuit connected through another of said cable conductors to receive a second potential difference existing between a second of said electrodes and a reference point spaced apart therefrom, as a result of current flow from said second electrode, said first and second potential differences being influenced to different degrees by the electrical resistivity of the material existing in a narrow zone extending laterally and outwardly of the wall of the well, and means for recording the differences of potential received by said first and second potential responsive circuits.

4. In well logging apparatus, the combination of downhole equipment including at least two spaced insulating members, a cable including a plurality of conductors supporting said equipment for movement through the well, at least one electrode carried by each of said insulating members and coupled to a respective one of said plurality of conductors, means for urging said members laterally of the well in order to bring the electrodes carried thereby into engagement with spaced regions of the wall of the well, said electrodes having exposed surface areas of different size facing the wall of the well at approximately the same well depth, means for passing electric current of predetermined magnitude between each of said electrodes and a reference point spaced apart therefrom, a first potential responsive circuit connected through at least one of said cable conductors to receive a first potential difference existing betwen a first of said electrodes and a reference point spaced apart therefrom as a result of current flow from said first electrode, a second potential responsive circuit connected through another of said cable conductors to receive a second potential difference existing between a second of said electrodes and a reference point spaced apart therefrom as a result of current flow from said second electrode, said first and second potential differences being influenced to different degrees by the electrical resistivity of the material existing in a narrow zone extending laterally and outwardly of the wall of the well, and means for recording the differences of potential received by such first and second potential responsive circuits.

5. In well logging apparatus, the combination of downhole equipment including insulating structure, a cable including a plurality of conductors supporting said equipment for movement through the well, at least two electrodes carried by said insulating structure in mechanical and electrical contact with the wall of the well and coupled to respective ones of said plurality of conductors, said electrodes having exposed surface portions of different area facing the wall of the well at approximately the same well depth, means for alternately energizing said electrodes in order to pass a first electric current of predetermined magnitude between one of said electrodes and a reference point spaced apart therefrom during a first interval of operation and to pass a second electric current of predetermined magnitude between the second of said electrodes and a reference point spaced apart therefrom during a second interval of operation, a first potential responsive circuit rendered operative in time correlation with the flow of said first current in order to receive a first potential difference existing between said one electrode and a reference point spaced apart therefrom as a result of said first electric current, a second potential responsive circuit rendered operative in time correlation with the flow of said second current in order to receive a second potential difference existing between the second of said electrodes and a reference point spaced apart therefrom as a result of said second electric current, said first and second potential differences being influenced to different degrees by the electrical resistivity of the material existing in a narrow zone extending laterally and outwardly of the wall of the well, and means for recording the differences of potential received by said first and second potential responsive circuits.

6. In well logging apparatus, the combination of downhole equipment including insulating structure, a cable including a plurality of conductors supporting said equipment for movement through the well, at least two electrodes carried by said insulating structure in mechanical and electrical contact with the wall of the well and coupled to respective ones of said plurality of conductors, said electrodes having exposed surface portions of different area facing the wall of the well at approximately the same well depth, means for passing a first periodically reversed current of predetermined magnitude between the first of said electrodes and a reference point spaced apart therefrom, means for passing a second periodically reversed current of predetermined magnitude between a second of said electrodes and a reference point spaced apart therefrom, a first potential responsive circuit connected through at least one of said cable conductors to receive a first potential difference existing between said first electrode and a reference point spaced apart therefrom as a result of one of said periodically reversed currents, a second potential responsive circuit connected through another of said cable conductors to receive a second potential difference existing between the second of said electrodes and a reference point spaced apart therefrom as a result of the other of said periodically reversed currents, said first and second potential differences being influenced to different degrees by the electrical resistivity of the material existing in a narrow zone extending laterally and outwardly of the wall of the well, and means for recording the differences of potential received by said first and second potential responsive circuits.

7. In well logging apparatus, the combination of downhole equipment including insulating structure, a cable including a plurality of conductors supporting said equipment for movement through the well, at least two electrodes carried by said insulating structure in mechanical and electrical contact with the wall of the well and coupled to respective ones of said plurality of conductors, said electrodes having exposed surface portions of different area facing the wall of the well at the same well depth, means for passing a first periodically reversed current of predetermined magnitude between the first of said electrodes and a reference point spaced apart therefrom, means for passing a second periodically reversed current of predetermined magnitude between the second of said electrodes and a reference point spaced apart therefrom, a first potential responsive circuit connected through at least one of said cable conductors to receive a first potential difference existing between said first electrode and a reference point spaced apart therefrom as a result of said first periodically reversed current, a second potential responsive circuit connected through another of said cable conductors to receive a second potential difference existing between the second of said electrodes and a reference point spaced apart therefrom as a result of the second periodically reversed current, said first and second potential differences being influenced to different degrees by the electrical resistivity of the material existing in a narrow zone extending laterally and outwardly of the wall of the well, means for recording the differences of potential received by said first and second potential responsive circuits, a signal transmitting system including said first electrode for transmitting signals indicative of the natural earth potentials at different well depths to the surface, and means at the surface recording said signals simultaneously with the recordings of said first and second potential differences.

8. In well logging apparatus, the combination of downhole equipment including insulating structure, a cable including a plurality of conductors supporting said equipment for movement through the well, at least two electrodes carried by said insulating structure in mechanical and electrical contact with the wall of the well and coupled to respective ones of said plurality of conductors, said electrodes having exposed surface portions of different area facing the wall of the well at approximately the same well depth, means for passing a first periodically reversed current of predetermined magnitude between a first of said electrodes and a reference point spaced apart therefrom, means for passing a second periodically reversed current of predetermined magnitude between a second of said electrodes and a reference point spaced apart therefrom, a first potential responsive circuit connected through at least one of said cable conductors to receive a first potential difference existing between said first electrode and the reference points spaced apart therefrom as a result of said first periodically reversed current, means for rendering said first potential responsive circuit operative in time correlation with the periodic reversals of said first current, a second potential responsive circuit connected through another of said cable conductors to receive a second potential difference existing between the second of said electrodes and a reference point spaced apart therefrom as a result of said second periodically reversed current, means for rendering said second potential responsive circuit operative in time correlation with the periodic reversals of said second current, said first and second potential differences being influenced to different degrees by the electrical resistivity of the material existing in a narrow zone extending laterally and outwardly of the wall of the well, and means for recording the differences of potential received by said first and second potential responsive circuits.

9. In well logging apparatus, the combination of downhole equipment including insulating structure, a cable including a plurality of conductors supporting said equipment for movement through the well, at least two electrodes carried by said insulating structure in mechanical and electrical contact with the wall of the well and coupled to respective ones of said plurality of conductors, said electrodes having exposed surface portions of different area facing the wall of the well at approximately the same well depth, a commutator including a plurality of commutating sections located at the surface, means including one of said commutating sections for passing a first periodically reversed current of predetermined magnitude between a first of said electrodes and a reference point spaced apart therefrom, means including a second of said commutating sections for passing a second periodically reversed current of predetermined magnitude between a second of said electrodes and a reference point spaced apart therefrom, a first potential responsive circuit connected to receive a first potential difference existing between said first electrode and a reference point spaced apart therefrom as a result of said first periodically reversed current, means including a third of said commutating sections for rendering said first potential responsive circuit operative in time correlation with the periodic reversals of said first current, a second potential responsive circuit connected to receive a second potential difference existing between the second of said electrodes and a reference point spaced apart therefrom as a result of said second periodically reversed current, means including a fourth of said commutating sections for rendering said second potential responsive circuit operative in time correlation with the periodic reversals of said second potential differences being influenced to different degrees by the electrical resistivity of the material existing in a narrow zone extending laterally and outwardly in the wall of the well, and means for recording the differences of potential received by said first and second potential responsive circuits.

10. In well logging apparatus, the combination of downhole equipment including insulating structure, a cable including a plurality of conductors supporting said equipment for movement through the well, at least two electrodes carried by said insulating structure in mechanical and electrical contact with the wall of the well and coupled to respective ones of said plurality of conductors, said electrodes having exposed surface portions of different area facing the wall of the well at approximately the same well depth, a commutator including a plurality of commutating sections located at the surface, means including a first of said commutating sections for passing a first periodically reversed current of predetermined magnitude between a first of said electrodes and a reference point spaced apart therefrom, means including a second of said commutating sections for passing a second periodically reversed current of predetermined magnitude between a second of said electrodes and a reference point spaced apart therefrom, a first potential responsive circuit connected through at least one of said cable conductors to receive a first potential difference existing between said first electrode and a reference point spaced apart therefrom as a result of said first periodically reversed current, means including a third of said commutating sections for rendering said first potential responsive circuit operative in time correlation with the periodic reversals of said first current, a second potential responsive circuit connected through another of said cable conductors to receive a second potential difference existing between the second of said electrodes and a reference point spaced apart therefrom as a result of said second periodically reversed current, means including a fourth of said commutating sections for rendering said second potential responsive circuit operative in time correlation with the periodic reversals of said second current, said first and second potential differences being influenced to different degrees by the electrical resistivity of the material existing in a narrow zone extending laterally and outwardly in the wall of the well, means for recording the differences of potential received by said first and second potential responsive circuits, a signal transmitting circuit including said first electrode for transmitting signals indicative of the natural earth potentials at different well depths to the surface, and means for recording said signals simultaneously with the recordings of said first and second potential differences.

11. Well logging apparatus comprising, downhole equipment adapted for movement through the well, first and second current electrodes on said equipment and characterized, respectively, by first and second exposed surface portions at approximately the same well depth and of relatively larger and smaller area, means to render said surface portions in mechanical and electrical contact with the wall of said well, current source means to produce flows of first and second currents of predetermined magnitude through the earth medium around said well by way, respectively, of said first and second electrodes, said source means being connected with said electrodes and medium to render the paths through said medium of said currents of lengths at least of the order of ten times the diameter of a circle of the area of the larger one of said surface portions, reference electrode means spaced from both said electrodes by a distance at least of said order, first potential detecting means in circuit with said first electrode and reference electrode means to make manifest a first potential developed therebetween by said first current flow, second potential detecting means in circuit with said second electrode and reference electrode means to make manifest a second potential developed therebetween by said second current flow, and means responsive to said potentials to register differences therebetween.

12. Well logging apparatus comprising, downhole equipment adapted to be moved through the well, first and second electrodes carried by said equipment to be rendered in mechanical and electrical contact with the earth medium around said well at approximately the same well depth and by respective surface portions of relatively larger and smaller area, direct current source means to produce flows of first and second currents each of predetermined magnitude through said medium by way, respectively, of said first and second electrodes, said source means being connected with said electrodes and medium to render the paths of said current through said medium of lengths at least of the order of ten times the diameter of a circle of the area of the larger one of said surface portions, reference electrode means spaced from both said electrodes by a distance at least of said order, first commutator means to limit to alternate first and second intervals, respectively, the flows of said first and second currents, said first means being adapted to reverse the polarity of each of said first and second currents during every other one of, respectively, said first and second intervals to thereby render each current of periodically reversing polarity, potential detecting means coupled with said electrodes and said reference electrode means to produce a signal comprised of first and second potentials respectively developed in said medium by said first and second currents to undergo corresponding periodic reversals in polarity, said signal also being comprised of a natural direct current potential developed in said medium, second commutator means synchronously operable with the first to pass said signal to first and second outputs during, respectively, said first and second intervals to thereby impress separately said first and second potentials on said first and second outputs, said second means being adapted to reverse the polarity of said signal at said first and second outputs during every other one of, respectively, said first and second intervals to thereby convert at each output the reversing polarity potential thereat into uni-directional potential and the natural potential thereat into alternating potential, first and second filter means respectively, following said first and second outputs to each reject said alternating potential and to pass, respectively, said first and second uni-directional potentials, and means to register the difference in value between said filtered uni-directional potentials.

References Cited in the file of this patent

UNITED STATES PATENTS

| | | |
|---|---|---|
| 2,268,137 | Evjen | Dec. 30, 1941 |
| 2,398,761 | Aiken | Apr. 23, 1946 |
| 2,617,852 | Waters | Nov. 11, 1952 |
| 2,669,688 | Doll | Feb. 16, 1954 |
| 2,712,629 | Doll | July 5, 1955 |
| 2,712,630 | Doll | July 5, 1955 |
| 2,728,047 | Doll | Dec. 20, 1955 |
| 2,754,475 | Norelius | July 10, 1956 |
| 2,770,771 | Schuster | Nov. 13, 1956 |
| 2,779,912 | Waters | Jan. 29, 1957 |
| 2,782,364 | Shuler | Feb. 19, 1957 |
| 2,838,731 | Cruzan | June 10, 1958 |